April 21, 1970 W. F. COOMBS, JR., ET AL 3,508,198

BINARY COMPARATOR CIRCUIT

Filed June 12, 1967 2 Sheets-Sheet 1

WILLIAM F. COOMBS JR.
ALEXANDER E. MARTENS
INVENTORS

BY Charles C. Krawczyk

ATTORNEY

WILLIAM F. COOMBS JR.
ALEXANDER E. MARTENS
INVENTORS

BY Charles C. Krawczyk

ATTORNEY 3,508,198

BINARY COMPARATOR CIRCUIT

William F. Coombs, Jr., Irondequoit, and Alexander E. Martens, Greece, N.Y., assignors to Bausch & Lomb Incorporated, Rochester, N.Y., a corporation of New York Filed June 12, 1967, Ser. No. 645,291
Int. Cl. G06f 7/02
U.S. Cl. 340—146.2 13 Claims

ABSTRACT OF THE DISCLOSURE

The comparator circuit includes $2n$ gate circuits, a pair for each digit order of two $n$ bit binary words to be compared. A first group of $n$ gate circuits receives binary signals of a first word and complementary signals of corresponding digit orders of the second word. A second group of $n$ gate circuits receives binary signals of the second word and complementary signals of the corresponding digit orders of the first word. Each pair of the $2n$ gate circuits receive equal weighting potentials in increasing magnitudes according to their corresponding digit order. The weighting potentials are passed by the gate circuits when enabled. Diodes couple the outputs of the first and second group of gate circuits to separate input circuits of a differential amplifier.

CROSS-REFERENCES TO RELATED APPLICATIONS

The binary comparison circuit of the present application is incorporated as a portion of a numerically controlled a circuit in a copending patent application Ser. No. 645,326 for A. E. Martens entitled Numerical Control Circuit, assigned to the assignee of the present application and filed on the same day as the present application.

FIELD OF THE INVENTION

This invention relates to an electrical circuit for digital comparator systems.

SUMMARY OF THE INVENTION

The comparator circuit of the invention includes $2n$ gate circuits, one pair for each digit order of two $n$ bit binary words to be compared. The gate circuits are separated into two groups. The first group receives binary values from a first $n$ bit word and complementary binary values from a second $n$ bit word. The second group receives binary values of corresponding digit order from the second $n$ bit word and complementary values of corresponding digit order from the first $n$ bit word. Equal weighting potentials are applied to the gate circuits of corresponding digit order increasing in magnitude in accordance with the digit order. The gate circuits, when enabled, develop output signals corresponding to the weighting potentials applied thereto. Unidirectional current means couple the output signals from the first and second groups of gate circuits to a first and second line respectively. Analog signals are developed on first and second lines corresponding to the most significant bit of the first and second words respectively for which there is no counterpart in the other word. The first and second lines are connected to separate input circuits of a circuit responsive to the difference between the analog signals to provide an output indicative of the difference between the binary words compared.

DESCRIPTION OF THE PREFERRED EMBODIMENTS

In the circuits of the invention, electrical signals represent binary bits. It is arbitrarily assumed that a positive going signal represents a bit (logic "1") and a negative-going signal, the absence of a bit (logic "0"). For the sale of brevity, the bit itself rather than the signal manifesting the bit is generally refered to in the following discussion.

Figure 1:
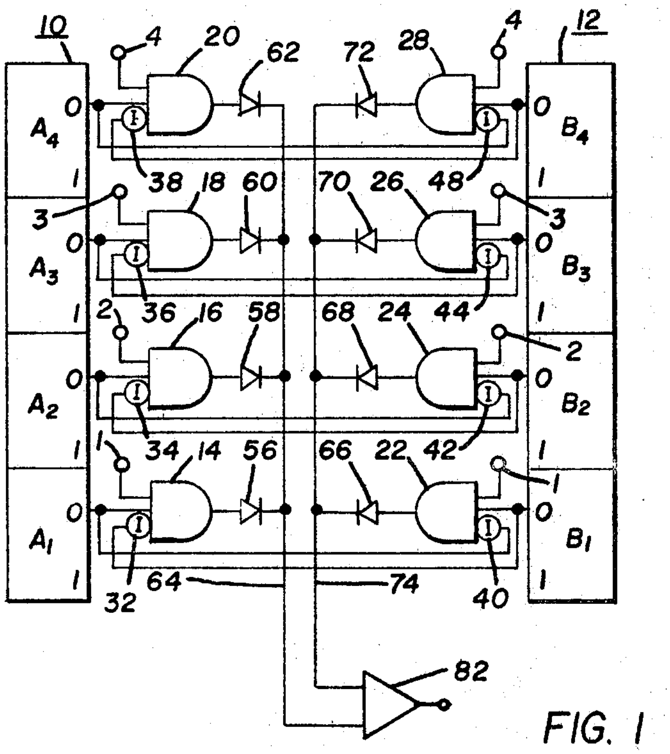
FIGURE 1 is an electrical schematic diagram of a first embodiment of a binary comparator circuit of the invention.

In the comparator circuit of FIGURE 1, the binary words to be compared are conventionally applied to two suitable storage registers 10 and 12. The storage registers 10 and 12 include four register stages, such a bi-stable multivibrator or flip-flop stages, designated $A_1$–$A_4$ and $B_1$–$B_4$ respectively. The order bit of the storage registers 10 and 12 is designated by a subscript to the letter in accordance with the increasing significant level or bits. For example, the register stage designated $A_1$ is the least significant bit, while $A_4$ is the most significant bit. Although only four register stages are illustrated in each storage register 10 and 12, any number can be included.

A pair of three input-gate circuits are provided for each digit order of the storage registers. The gate circuits are designated by the reference numerals 14–28. The gate circuits 14–20 are separated into a first group coupled to receive binary value signal representations or bits of a first word stored in the corresponding digit order stages of the storage register 10. The gate circuits 22–28 form a second group coupled to receive binary value signal reprensations or bits of a second word stored in the corresponding digit order stages of the storage register 12. An input circuit of each of the gate circuits 14–28 is coupled through an inhibitor or inverter circuit 32–48 respectively to receive a complementary signal of the bit stored in the corresponding digit order stage of the other storage register. For example, the gate circuits 14–20 receive complementary signals from the storage register 12 while gate circuits 22–28 receive complementary signals from the storage register 10. Since a binary signal representation is designated by a logic "1" of a positive voltage level, the complementary signal is designated by a logic "0" of a negative voltage level or zero volts. Accordingly, there is no output from any of the gate circuits 14–28 unless there is a bit stored in its associated register stage and no bit is stored in the register stage of the same digit order in the other storage register.

Figure 2:
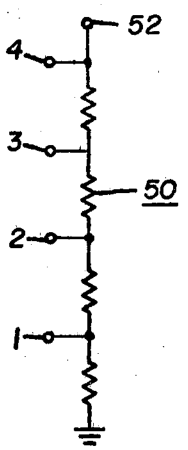
FIGURE 2 is an electrical schematic diagram of a voltage divider, the outputs of which are appropriately coupled to the binary counter circuit of FIGURE 1.

The third input to the gate circuits receives a weighting signal from a voltage divider circuit 50 shown in FIGURE 2. The voltage divider circuit includes a plurality of resistors (four) corresponding to the number of register stages in the storage registers 10 and 12. The resistors are coupled between a terminal 52 adapted to be connected to a source of energizing potential (such as a direct current power supply) and ground. Four weighting voltages are supplied to the terminals 1–4 from the voltage divider 50 with the greatest amplitude at terminal 4 and progressively lower voltage at the other terminals. Although a resistive voltage divider is illustrated, it is to be understood that other means of providing a plurality of voltages, such as a string of Zener diodes, batteries etc., can also be employed.

The terminals 1–4 are connected to the third input circuit of the gate circuits 14–28 as designated by the same reference numerals (1–4). The same voltage is applied to the pair of gate circuits connected to the same digit order stages of the storage registers 10 and 12 with increasing voltage levels coupled to the gate circuit pairs associated with higher significant bits or digit orders in the corresponding register stages. Thus, for example, the potential applied to the third input circuit of gate circuits 20 and 28 from the terminal 4 is at a higher level than the potential applied to the gate circuits 18 and 26.

Figure 3:
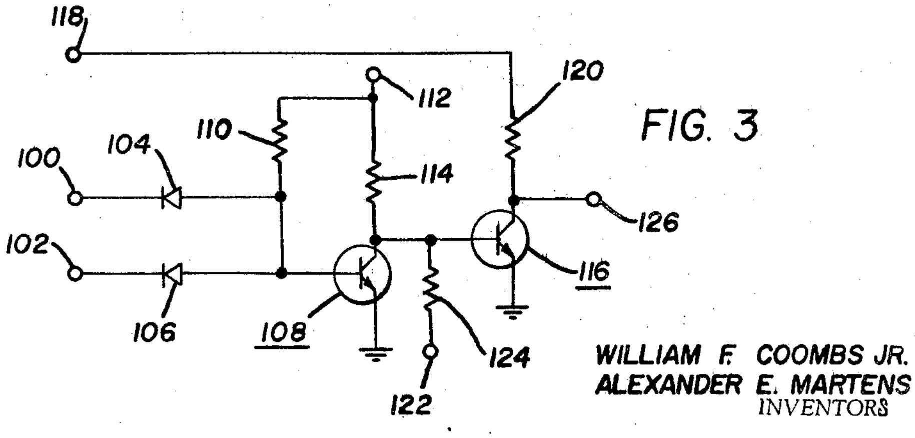
FIGURE 3 is an electrical schematic diagram of an embodiment of a gate circuit for the comparator circuits of FIGURES 1 and 4.
Figure 4:
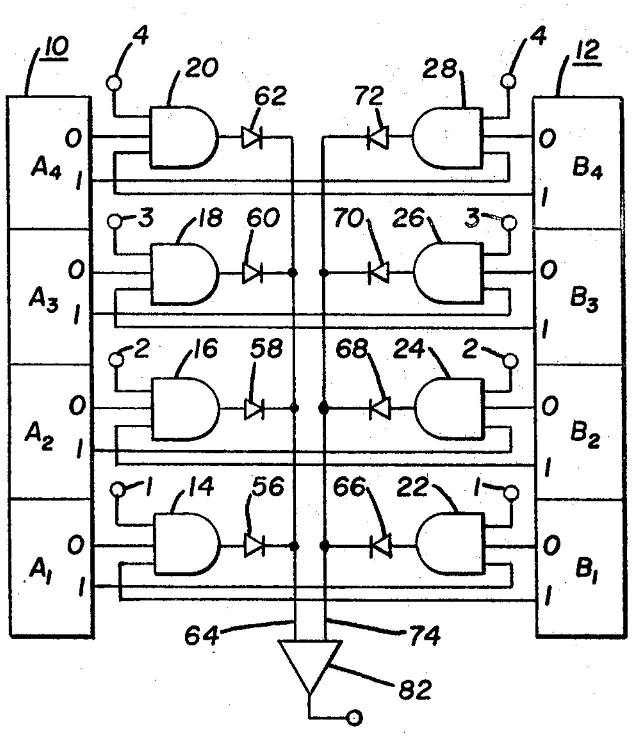
FIGURE 4 is an electrical schematic diagram of a second embodiment of a binary comparator circuit of the invention.
Figure 5:
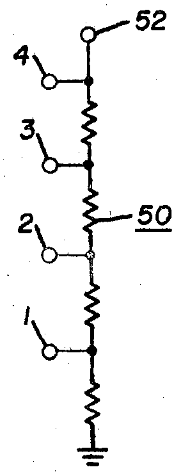
FIGURE 5 is an electrical schematic diagram of a voltage divider, the outputs of which are appropriately coupled to the binary counter circuit of FIGURE 4.

FIGURE 3 is an illustration of an embodiment of a gate circuit for use in the comparator circuits of FIGURES 1 and 4. The terminals 100 and 102 receive the binary signal and the complementary signals from the inverter circuits in FIGURE 1 respectively. The terminals 100 and 102 are connected through the diodes 104 and 106 to the base electrode of a transistor 108 and to a resistor 110 connected to a power supply terminal 112. The collector and emitter electrodes of the transistor 108 are connected between ground and the power terminal 112 through a resistor 114. In absence of the signals (positive bits) on both the terminals 100 and 102, the transistor 108 is cut off. When both signals are present, the transistor 108 is saturated.

The collector electrode of the transistor 108 is coupled to the base electrode of a transistor 116. The collector and emitter electrode of the transistor 116 are connected between ground and a third input terminal 118 through a resistor 120. A biasing potential is applied to the base electrode of the transistor 116 from a power supply terminal 122 through a resistor 124. The transistor 116 is saturated when the transistor 108 is cut off and vice versa. The weighting potential from the voltage divider 50 is applied to the terminal 118 so that when the transistor 116 is cut off (signals are present at both the terminals 100 and 102) the weighting potential is developed at the output terminal 126. In effect the circuit of FIGURE 3 functions as a logic product or AND gate circuit requiring signals at all three input terminals 100, 102 and 118 to produce an output signal.

Alternatively, if a simple diode logic AND gate circuit is to be used, an output signal equal to the weighting potential is developed when the magnitude of the weighting potential at the terminal 4 is equal to or less than the magnitude of the lowest amplitude signal applied to the other input terminals of the gate circuits.

The output circuits of the gate circuits 14–20 are coupled through the diodes 56–62 respectively to a common line 64, while the output circuits of the AND gates 22–28 are coupled through the diodes 66–72 respectively to a common line 74. As a result of this arrangement, an analog signal is developed on the common lines 64 and 74 corresponding to the most significant bit stored in the associated register 10 and 12 respectively for which there is no bit in the other register. For example, if a bit is stored in the register stage $A_3$ and there is no bit stored in the corresponding digit order register stage $B_3$, the gate circuit is enabled so that the steering diode 60 passes a signal to the line 64 proportional to the voltage developed at the terminal 3. This voltage level is higher than that applied to the AND gates 16 and 14 coupled to the register stages $A_1$ and $A_2$ of the lower order bits and thereby back biases the diodes 58 and 56 assuring that a precise voltage level corresponding to the most significant bit difference appears on the line 64. An analog signal also appears on the line 74 having a magnitude corresponding to the highest significant bit in the register 12 having no counterpart in the same order in the storage register 10.

The lines 64 and 74 are coupled to separate input circuits of a differential amplifier 82. The differential amplifier provides an output signal that is indicative of the difference of the amplitude of the analog signals received from the lines 64 and 74. For example, the differential amplifier 82 can provide a uni-polar or a bipolar signal proportional to the difference between the signals applied to the lines 64 and 74 and therefore proportional to the difference between the most significant bits stored in the storage registers 10 and 12, or merely provide a change polarity to indicate the storage register with the larger stored word. When the voltages on the lines 64 and 74 are equal, the output from the differential amplifier can be at a designated potential or zero volts.

The embodiment of FIGURE 4 is essentially the same as that in FIGURE 1 except that the inverter circuits 32–48 are eliminated. Accordingly, for simplification purposes, the same elements in the embodiments of FIGURES 1 and 4 are designated by the same reference numeral. The inverter circuits are eliminated by connecting the third input circuit of the gate circuits 14–28 (connected to the inverter circuits in FIGURE 1) to an output circuit of the flip-flops $A_1$–$A_4$ and $B_1$–$B_4$ that provides complementary signal representations of the bit stored in the register stages 10 and 12. The binary comparison circuit of FIGURE 4 effectively functions in the same manner as set forth with regards to the circuit of FIGURE 1 to provide an output signal on the lines 64 and 74 corresponding to the most significant digit in the storage registers 10 and 12 respectively in which there is no corresponding bit of the same digit order in the other storage register.

The binary comparison circuits of FIGURES 1 and 4 provide a rapidly responding comparison circuit for use in various digital-analog servo systems wherein a digital to analog conversion is required. The circuit of the invention is adapted to compare large digital signals or numbers and provide output analog signals corresponding to the difference between the numbers.

What is claimed is:

1. A circuit for comparing two binary words stored in two binary registers each having an equal number of corresponding digit order stages comprising:
   - a pair of gate circuits for each register stage of corresponding digit order, said gates having a plurality of input circuits, and an output circuit;
   - means for applying signals representations of the binary value contained in each digit order stage of said registers to an input circuit of separate ones of said pair of gate circuits of the corresponding digit order;
   - means for applying signal representations of the complementary of the binary value contained in each digit order stage to another input circuit of the opposite ones of said pair of gate circuits of the corresponding digit order;
   - means for applying a signal to an input circuit of each pair of gate circuits the amplitude of which is function of digit order of the corresponding register stage;
   - unidirectional current means coupling the output circuits of said gate circuits receiving binary value signal representations from one register to a common lead;
   - unidirectional current means coupling the output circuit of said gate circuits receiving binary value signal representations from the other register to another common lead; and
   - circuit means coupled to said two common leads responsive to the potential thereon for providing an output indicative of difference between the two binary words.

2. A circuit as defined in claim 1 wherein said circuit means responsive to the potential difference on said common lines comprises a differential amplifier.

3. A circuit as defined in claim 1 wherein said unidirectional current means comprises a plurality of diodes with a diode coupling the output circuit of each gate circuit to one of said common lines.

4. A circuit as defined in claim 1 wherein said means for applying signals of equal amplitude to siad gate circuits comprises:

a voltage divider providing a plurality of voltages of progressively increasing amplitudes corresponding to the number of pairs of gate circuits; and circuit means applying said plurality of voltages to said gate circuits with the same amplitude of voltage to each pair of gate circuits and with amplitudes proportional to the digit order of the corresponding digit order stage.

5. A circuit for comparing two $n$ bit binary words comprising:

$2n$ gate circuits, a pair for each digit order of said binary words;

$n$ first lines respectively supplying manifestations of a first $n$ bit binary word to separate ones of $n$ gate circuits defining a first group of gate circuits;

$n$ second lines respectively supplying manifestations of the complementary value of said first $n$ bit binary word to separate ones of $n$ gate circuits other than that of said first group defining a second group of gate circuits;

$n$ third lines respectively supplying manifestations of a second $n$ bit binary word to separate ones of $n$ gate circuits of corresponding digit order in said second group;

$n$ fourth lines respectively supplying manifestation of the complementary value of said second $n$ bit binary word to separate ones of $n$ gate circuits of corresponding digit order in said first group:

circuit means for supplying $n$ weighting signals of increasing magnitudes;

circuit means coupling said $n$ weighting signals to said $2n$ gate circuits with the same signal applied to the pair of gate circuits of the same digit order and increasing in magnitude in accordance with the digit order so that said gate circuits when enabled provide an output signal proportional to the magnitude to the weighting signal applied thereto;

circuit means including a pair of input circuits for providing an output signal indicative of the difference between the signals applied to said pair of input circuits;

$n$ first unidirectional current means coupling the output of $n$ gate circuits of said first group to one of said pair of input circuits; and $n$ second unidirectional current means coupling the output of $n$ gate circuits of said second group to the other one of said pair of input circuits.

6. A circuit as defined in claim 5 wherein said circuit means for supplying $n$ signals comprises a voltage divider network wherein the maximum magnitude of signal developed is equal to or less than the magnitude of the other signals applied to the gate circuits.

7. A circuit as defined in claim 6 wherein said circuit means including a pair of input circuits comprises a differential amplifier circuit.

8. A circuit as defined in claim 5 wherein each of said $2n$ gate circuits include first, second and third input circuits and an output circuit, requiring signals on all three input circuits to develop an output signal corresponding to the signal applied to the third terminal, and said weighting signals are applied to said third terminal.

9. A circuit as defined in claim 8 wherein said $2n$ gates circuits include a first switching circuit receiving input signals from said first and second input circuits for actuating a second switching circuit to pass the signals applied to said third input circuit.

10. A circuit for comparing two $n$ bit binary words comprising:

first and second groups of $n$ gate circuits;

circuit means for developing $n$ weighting potentials of different magnitudes;

first circuit means applying said $n$ weighting potentials to said first and second groups of gates circuits with a gate in each group receiving the same weighting potential;

$n$ first lines supplying manifestations of a first $n$ bit word;

$n$ second lines supplying manifestations of a second $n$ bit word;

second circuit means coupling corresponding digit orders of said first and second lines to said first and second group of gate circuits with the digit order corresponding to the magnitude of the weighting potential received by the gate so that said gate circuits are enabled to pass said weighting potential when a bit is present in one line to the exclusion of a bit in the other line of the same digit order; and third circuit means coupled to said first and second group of gate circuits responsive to the weighting potentials passed by said gate circuit to develop a bipolar signal having a polarity corresponding to the greater of said first and second words.

11. A circuit as defined in claim 10 wherein the amplitude of the bipolar signal developed by said third circuit means is related to the most significant bit differences between said first and second words.

12. A circuit as defined in claim 10 wherein said third circuit means includes:

first and second unidirectional current means for coupling the weighting potentials passed by said first and second group of gate circuits respectively to a third and fourth line respectively; and differential circuit means coupled to said third and fourth lines responsive to the potentials thereon for designating the line having the greater potential.

13. A circuit as defined in claim 10 wherein said second circuit means applies signal manifestation of the first and second words to the first and second group of gate circuits respectively and complementary signal manifestations of the first and second words to the second and first group of gate circuits respectively.

References Cited

UNITED STATES PATENTS

| | | | |
|---|---|---|---|
| 3,124,677 | 3/1964 | Miller | 340—146.2 X |
| 3,139,523 | 6/1964 | Luke | 340—146.2 X |

EUGENE G. BOTZ, Primary Examiner

R. S. DILDINE, Jr., Assistant Examiner

U.S. Cl. X.R.

307—218